(12) United States Patent
Goto

(10) Patent No.: US 6,814,032 B2
(45) Date of Patent: Nov. 9, 2004

(54) DUAL FUEL ENGINE

(75) Inventor: Satoru Goto, Tokyo (JP)

(73) Assignee: Niigata Power Systems Co., Ltd. (JP)

( * ) Notice: Subject to any disclaimer, the term of this patent is extended or adjusted under 35 U.S.C. 154(b) by 0 days.

(21) Appl. No.: 10/469,212

(22) PCT Filed: Dec. 25, 2001

(86) PCT No.: PCT/JP01/11364

§ 371 (c)(1),
(2), (4) Date: Aug. 27, 2003

(87) PCT Pub. No.: WO03/056159

PCT Pub. Date: Jul. 10, 2003

(65) Prior Publication Data

US 2004/0065293 A1 Apr. 8, 2004

(51) Int. Cl.[7] .............................. F02B 3/00; F02B 75/04
(52) U.S. Cl. ............................... 123/27 GE; 123/48 D; 123/78 D; 123/526; 123/256; 123/275
(58) Field of Search .............................. 123/48 R, 48 D, 123/78 R, 78 D, 27 GE, 525, 526, 253, 256, 261, 268, 273, 274, 275, 277

(56) References Cited

U.S. PATENT DOCUMENTS

| 5,201,907 A | * | 4/1993 | Hitomi et al. ............. 123/48 D |
| 5,887,566 A | * | 3/1999 | Glauber et al. ............. 123/275 |

FOREIGN PATENT DOCUMENTS

| EP | 957245 | 11/1999 |
| JP | 8-4562 | 1/1996 |
| JP | 10-238374 | 9/1998 |
| JP | 2000-110595 | 4/2000 |
| JP | 2001-193512 | 7/2001 |
| JP | 2001-303958 | 10/2001 |

* cited by examiner

*Primary Examiner*—Noah P. Kamen
(74) *Attorney, Agent, or Firm*—Ostrolenk, Faber, Gerb & Soffen, LLP

(57) ABSTRACT

The present invention aims to allow an arbitrary selection to be made between gas operation and diesel operation, to achieve a reduction in NOx even when in diesel operation, to allow the compression ratio to be adjusted and altered in accordance with the operating state when in gas operation, to allow quick starting, and to perform operations at a high combustion efficiency over the entire load range. The dual fuel engine of the present invention is provided with a precombustion chamber unit, which is located in the cylinder head of the dual fuel engine, having a precombustion chamber and an electromagnetic fuel injection valve (a liquid fuel injection valve) and also with a compression ratio control valve. The compression ratio control valve opens and closes an air passage that connects the main combustion chamber with an intake port. In gas operation, the valve opening time of the compression ratio control valve is adjusted in accordance with the operating state, and the compression is adjusted by allowing a portion of the air gas mixture inside the main combustion chamber to escape to the intake port. Fuel gas is ignited by a pilot quantity of liquid fuel from the electromagnetic fuel injection valve and is then combusted. In diesel operation, the compression ratio control valve is closed and liquid fuel injected at a high compression ratio from the electromagnetic fuel injection valve is combusted by a precombustion method.

13 Claims, 7 Drawing Sheets

VALVE CLOSING TIMING OF OPENING/CLOSING ADJUSTMENT VALVE OF COMPRESSION RATIO CONTROL VALVE (CRANKSHAFT ROTATION ANGLE)

DUAL FUEL ENGINE

BACKGROUND OF THE INVENTION

1. Field of the Invention

The present invention relates to a dual fuel engine capable of running on either gas fuel or liquid fuel by the selection of an operation mode.

2. Description of the Related Art

Conventionally, what is known as a 'dual fuel engine', which is capable of operating using both a gas operation mode, in which a gas fuel is used, and a diesel operation mode, in which a liquid fuel is used, is known as an engine that drives a power generator. An example of this engine is one that switches between operation modes and when in gas operation mode operates by combusting a vapor fuel using a liquid fuel injection valve provided in the center of the cylinder head, with a small quantity of pilot fuel oil (a liquid fuel of approximately 5–15% of the total heat quantity) as an ignition source. When in diesel operation mode, this engine is able to operate by combusting 100% liquid fuel using the liquid fuel injection valve.

In this dual fuel engine, because the compression ratio is lowered in comparison to a diesel engine in order to avoid knocking when in gas operation mode, compression ignition of the pilot fuel oil at startup is difficult. Therefore, when in gas operation mode, a liquid fuel having a high ignitability is used as the pilot fuel to aid the ignition of the vapor fuel, which has a low ignitability. Specifically, the engine is first started up using a liquid fuel that has excellent ignitability and is then run until it is warmed up. When the engine has warmed up and the engine operation load ratio is approximately 30% or greater, the fuel is switched from a liquid fuel to a gas fuel.

In the aforementioned conventional engine, as a result of combusting a liquid fuel of approximately 5–15% of the total heat quantity as pilot fuel oil in gas operation mode, it is not possible to meet the regulation values for NOx and soot that are applied to gas engines. In order to reduce NOx and soot, it is possible to ignite and combust gas fuel alone by using an ignition plug or a glow plug instead of using this pilot fuel oil ignition method. However, in this case, a pilot fuel injection valve for vapor fuel is needed in addition to the liquid fuel injection valve, resulting in problems arising such as the engine structure becoming complicated, and the number of parts as well as the engine manufacturing costs increasing.

Moreover, in gas operation mode, because startup by compression ignition of the pilot fuel oil is difficult and requires the engine to be warmed up as described above, it is not possible to start the engine quickly. Moreover, because the compression ratio is set low, the problems arise that thermal efficiency at low load is deteriorated and the stability of the combustion does not improve.

Furthermore, in diesel mode operation, high combustion efficiency can be obtained by directly injecting liquid fuel into the main combustion chamber and combusting it. However, the NOx value in the exhaust gas is then high giving rise to the problems of it not being possible to meet exhaust gas regulation values, which are expected to be consolidated even further in future, and an after treatment by a NOx removal system becoming necessary. Consequently, installation costs are very high.

The present invention was conceived in view of the above circumstances and it is an object thereof to provide a dual fuel engine that allows an arbitrary selection to be made between gas operation and diesel operation, that enables regular electric power generation to be performed by gas operation and emergency electric power generation to be performed by diesel operation, and that, in addition, achieves a reduction in NOx even when in diesel operation.

A further object of the present invention is to provide a dual fuel engine that allows adjustments and alterations to be made in the compression ratio of a vapor compressed in a cylinder in accordance with the operating state of the engine, that can be started quickly even when in gas operation, and that makes operations at a high combustion efficiency possible over the entire load range.

SUMMARY OF THE INVENTION

In order to solve the above described problems, the present invention is characterized by the following points.

Namely, the first invention of the present invention is a dual fuel engine that provides drive output by combusting, in a main combustion chamber partitioned by a cylinder, by a piston that moves reciprocally inside this cylinder, and by a cylinder head having an intake port provided with an intake valve and an exhaust port provided with an exhaust valve, one of either a gas fuel or a liquid fuel together with a gas compressed by the piston in accordance with an operation mode, wherein the dual fuel engine is provided with a precombustion chamber unit, which is located in the cylinder head of the dual fuel gas engine, having a precombustion chamber that has a liquid fuel injection valve and that combusts liquid fuel injected from this liquid fuel injection valve together with the compressed gas, and wherein the dual fuel engine is also provided with a compression ratio control valve that is located in an air passage that connects the main combustion chamber with the exterior of the main combustion chamber and that varies the compression ratio of the gas in an initial stage of compression of the gas by the piston by opening and closing the air passage so as to allow a portion of the compressed gas to escape to the air passage, and with a fuel gas feeding apparatus that feeds gas fuel to the main combustion chamber.

In the above described dual fuel engine, in gas operation mode a fuel air mixture formed by mixing gas fuel from the fuel gas feeding apparatus with air from an intake port is fed to the main combustion chamber and compressed by a piston stroke. A portion of this compressed fuel air mixture enters into the precombustion chamber of the precombustion chamber unit and is ignited by an extremely small pilot quantity of liquid fuel injected from the liquid fuel injection valve. The remainder of the fuel air mixture inside the main combustion chamber is then combusted by this ignited flame. Moreover, in the initial stages of the compression of the air fuel mixture by the piston, the air passage is opened and closed by the compression ratio control valve and a portion of the compressed fuel air mixture escapes from the main combustion chamber via the air passage so that the compression ratio of the fuel air mixture inside the main combustion chamber is able to be changed.

In diesel operation mode, the feeding of gas fuel from the fuel gas feeding apparatus is cut off and the air passage is closed by the compression ratio control valve. Air fed from the intake port to the main combustion chamber is compressed by the piston to a compression ratio suitable for diesel operation. 100% of the liquid fuel injected from the liquid fuel injection valve is ignited in the precombustion chamber by this compressed air and is combusted.

According to this dual fuel engine, when in gas operation mode, by opening and closing the air passage connecting the main combustion chamber with the outside thereof using the compression ratio control valve, the compression ratio of the gas air mixture introduced into the main combustion chamber is able to be changed. As a result, by adjusting the compression ratio as is appropriate in accordance with the operating state, such as whether the engine is being started up, is running at low load, or is running at high load, compression ignition of the liquid fuel at startup can be achieved without using an ignition device such as an ignition plug, and the engine can be started without being warmed up. Furthermore, by setting the compression ratio at the same level as for diesel operation even in the low load range, thermal efficiency and combustion stability is improved. Accordingly, a high thermal efficiency over the entire load range can be obtained.

In diesel operation mode, because 100% of the liquid, fuel injected from the liquid fuel injection valve is combusted using a precombustion method in which the liquid fuel is ignited in a precombustion chamber, the engine can be run with the NOx discharge density comparatively suppressed.

Consequently, according to this dual fuel engine, a single engine can be used to the power generator which is normally operated by the gas operation mode in which full advantage is taken of the low pollution properties of gas fuel, and is also operated by the diesel operation mode in emergencies as a disaster prevention power source and the like.

The second invention of the present invention is the dual fuel engine according to the above first invention, wherein, in gas operation mode, by altering opening and closing timings of the air passage in accordance with an operation state such as engine startup, low load operation, or high load operation, the compression ratio control valve adjusts the compression ratio by raising it for startup and low load operation and lowering it for high load operation.

In this dual fuel engine, in gas operation mode, because the compression ratio of the gas air mixture inside the main combustion chamber is high at startup and when the engine is operating at a low load, compression ignition of the slight pilot quantity of liquid fuel injected into the precombustion chamber from the liquid fuel injection valve can be performed reliably without using an ignition device. As a result, startup of the engine is simple and combustion efficiency and combustion stability are improved. Moreover, when operating at a high load, because the compression ratio of the air fuel mixture is low, knocking can be avoided and stable combustion can be achieved. Furthermore, even during combustion generated by compression ignition of liquid fuel, because the injection amount is extremely slight, the discharge density of NOx and soot can be kept at an extremely low level.

The third invention of the present invention is the dual fuel engine according to the second invention, wherein opening and closing timings of the compression ratio control valve are set such that the valve is opened at a start time of a compression stroke of the gas by the piston, and the valve is closed when a predetermined crankshaft rotation angle is reached with the engine crankshaft rotation angle at the start time of the compression stroke taken as a reference.

In this dual fuel engine, because the opening and closing timings of the compression ratio control valve are set based on the engine crankshaft rotation angle, the compression ratio of the gas in the main combustion chamber when in gas operation mode is set accurately for the operating load.

The fourth invention of the present invention is the dual fuel engine according to any one of the first to third inventions, wherein the fuel gas feeding apparatus is provided with a gas feeding pipe that is connected to the intake port, an electromagnetic valve that adjusts a feeding quantity of gas fuel from a gas fuel source to the gas feeding pipe, and an electromagnetic valve driver that drives the electromagnetic valve to open and close by speed governing control, and wherein injection of a pilot quantity of liquid fuel by the liquid fuel injection valve and injection of liquid fuel by speed governing control are possible, and, moreover, wherein the compression ratio control valve is operated by an electromagnetic coil with adjustment of a valve opening time from when the valve is opened so as to communicate the main combustion chamber with the air passage until the valve is closed so as to shut off this communication being possible in accordance with an operating state of the engine, and, furthermore, wherein a control apparatus that operates each is connected to the electromagnetic valve driver, the liquid fuel injection valve, and the electromagnetic coil, and this control apparatus operates by selection of the operation mode and when in gas operation operates the electromagnetic valve driver by speed governing control such that the electromagnetic valve is opened and closed, and operates the liquid fuel injection valve to cause it to inject a pilot quantity of liquid fuel, and also operates the electromagnetic coil such that the valve opening time of the compression ratio control valve is adjusted in accordance with the operating state of the engine, while in diesel operation mode operates the electromagnetic valve driver such that the electromagnetic valve is closed, and operates the liquid fuel injection valve such that injection of liquid fuel by speed governing control is performed, and also operates the electromagnetic coil such that the compression ratio control valve is closed.

In this dual fuel engine, when in gas operation mode, the electromagnetic valve driver opens and closes the electromagnetic valve using speed governing control based on operation commands from the control apparatus. Gas fuel is fed as the main fuel to the interior of the main combustion chamber and the fuel injection valve injects a pilot quantity of liquid fuel. In addition, the electromagnetic coil adjusts the valve opening timings of the compression ratio control valve in accordance with the operating state of the engine. As a result, because the valve open time of the compression ratio control valve is shortened and the compression ratio of the air gas mixture inside the main combustion chamber is raised at engine startup or when the engine is operating at low load, compression ignition of the pilot quantity of liquid fuel injected from the liquid fuel injection valve is simplified, and an engine can be started without it depending on the engine being warmed up. Moreover, not only is an operation with excellent combustion efficiency made possible, but because at high load the valve open time of the compression ratio control valve is shortened and the compression ratio of the air gas mixture reduced, knocking is also reliably prevented from being generated and stable operation is made possible.

Moreover, when in diesel operation mode, based on an operation command from the control apparatus, the electromagnetic valve driver closes the electromagnetic valve. The liquid fuel injection valve injects liquid fuel into the precombustion chamber using speed governing control, and the electromagnetic coil closes the compression ratio control valve. As a result, the compression ratio of the air inside the main combustion chamber is raised and liquid fuel is combusted as the main fuel by a precombustion method. This enables NOx in the exhaust gas to be reduced when the engine is in operation.

The fifth invention of the present invention is the dual fuel engine according to the above described first to fourth inventions, wherein the air passage is connected to the intake port.

In this dual fuel engine, because a portion of the air gas mixture introduced into the main combustion chamber is returned to the intake port, gas fuel is not wasted and is used effectively.

The sixth invention of the present invention is the dual fuel engine according to the above described first to fifth inventions, wherein the air passage is connected to an insert intake manifold of an exhaust turbocharger that is driven by exhaust gas from the exhaust port and feeds compressed air to the intake port.

In this dual fuel engine, because a portion of the air gas mixture introduced into the combustion chamber is blown onto the impeller of a compressor in the an exhaust turbocharger, the transient response performance of the exhaust turbocharger is improved and, in low load regions, the exhaust temperature is raised and quantity of black smoke that is output is reduced.

DESCRIPTION OF THE PREFERRED EMBODIMENTS

The embodiments of the present invention will now be described with reference made to the attached drawings.

Figure 1:
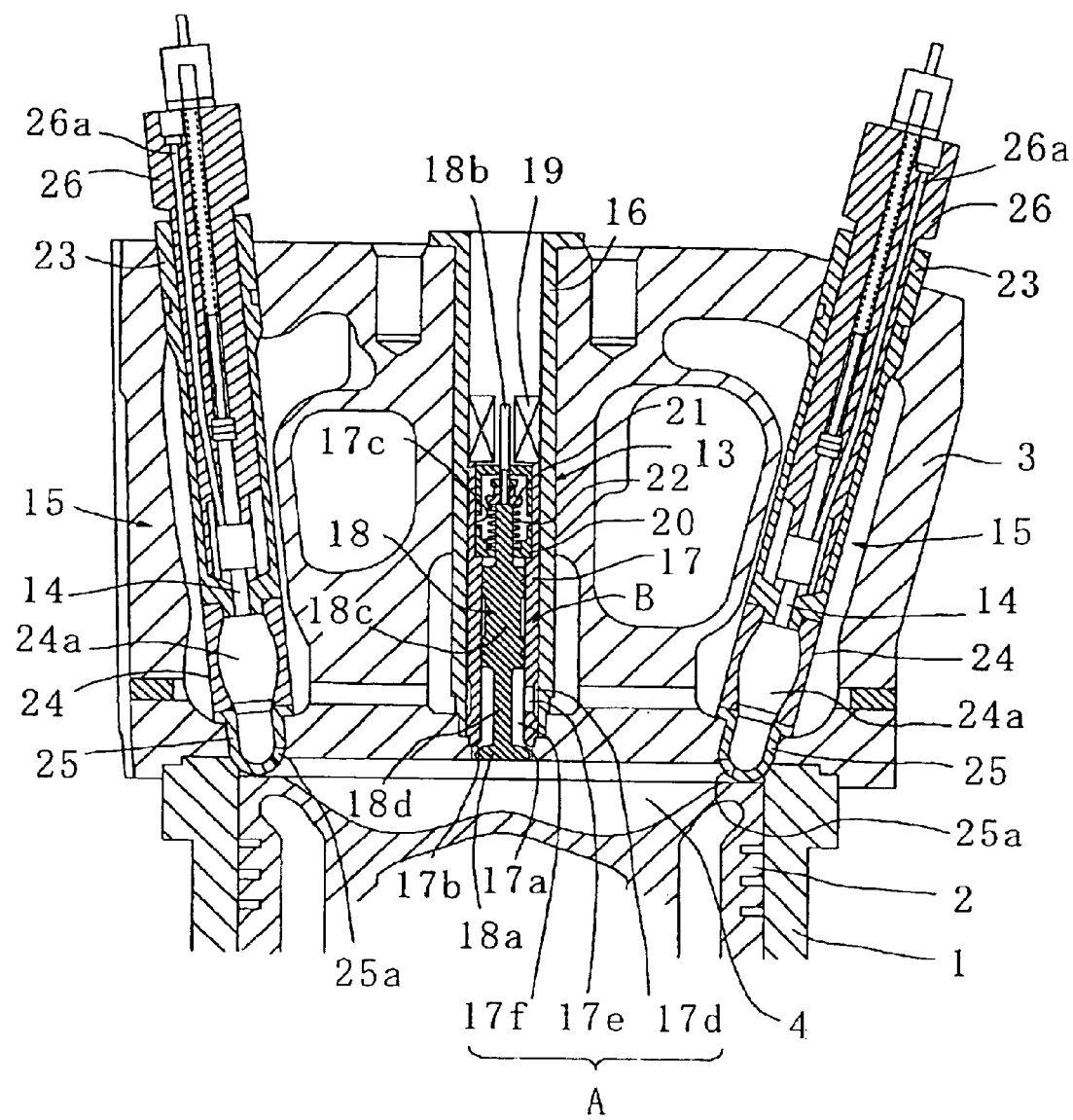
FIG. 1 is a vertical cross-sectional view showing one side of a vicinity of a cylinder head in an embodiment of the dual fuel engine according to the present invention.
Figure 2:
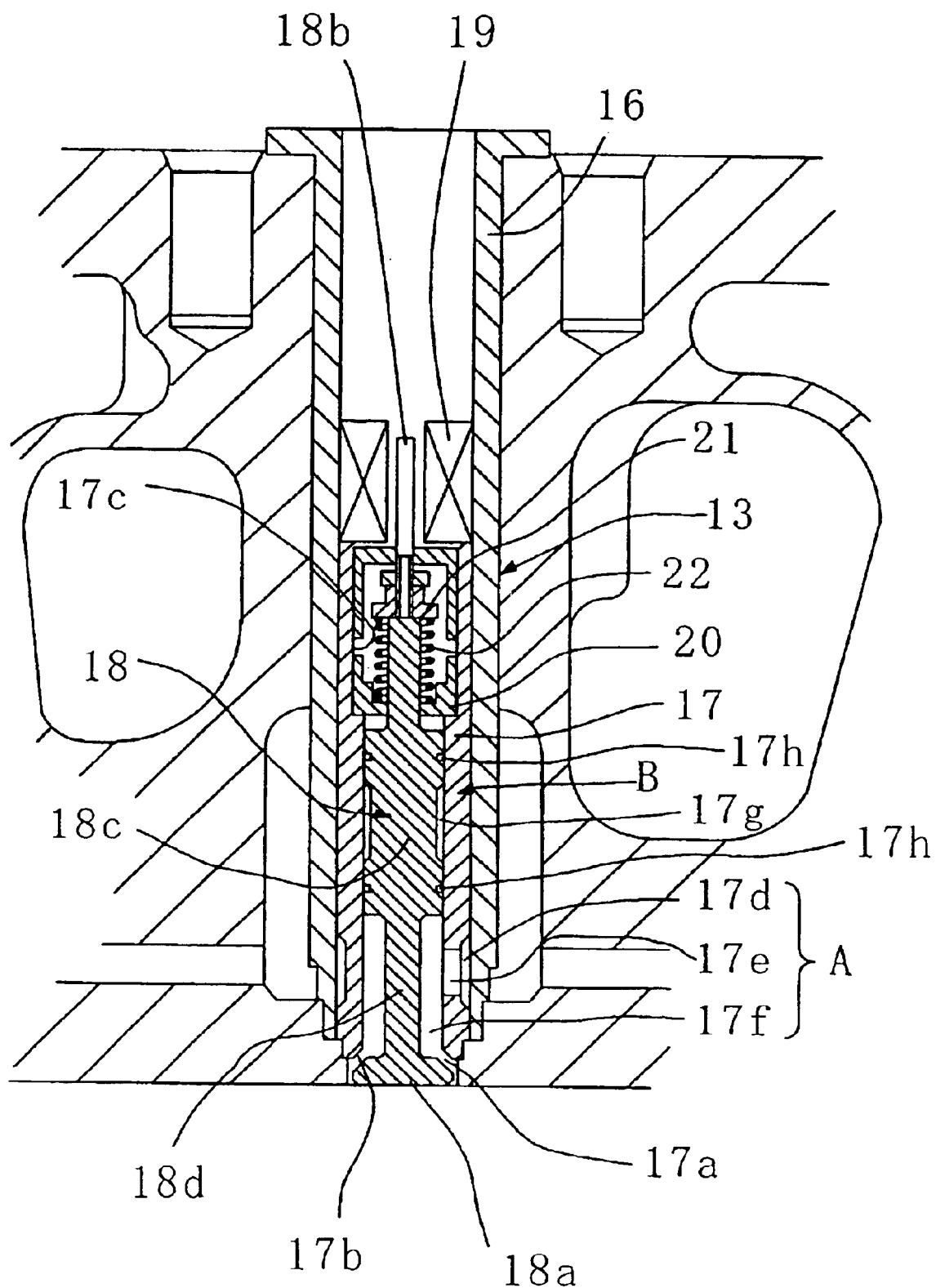
FIG. 2 is a partial enlarged cross-sectional view of FIG. 1.
Figure 3:
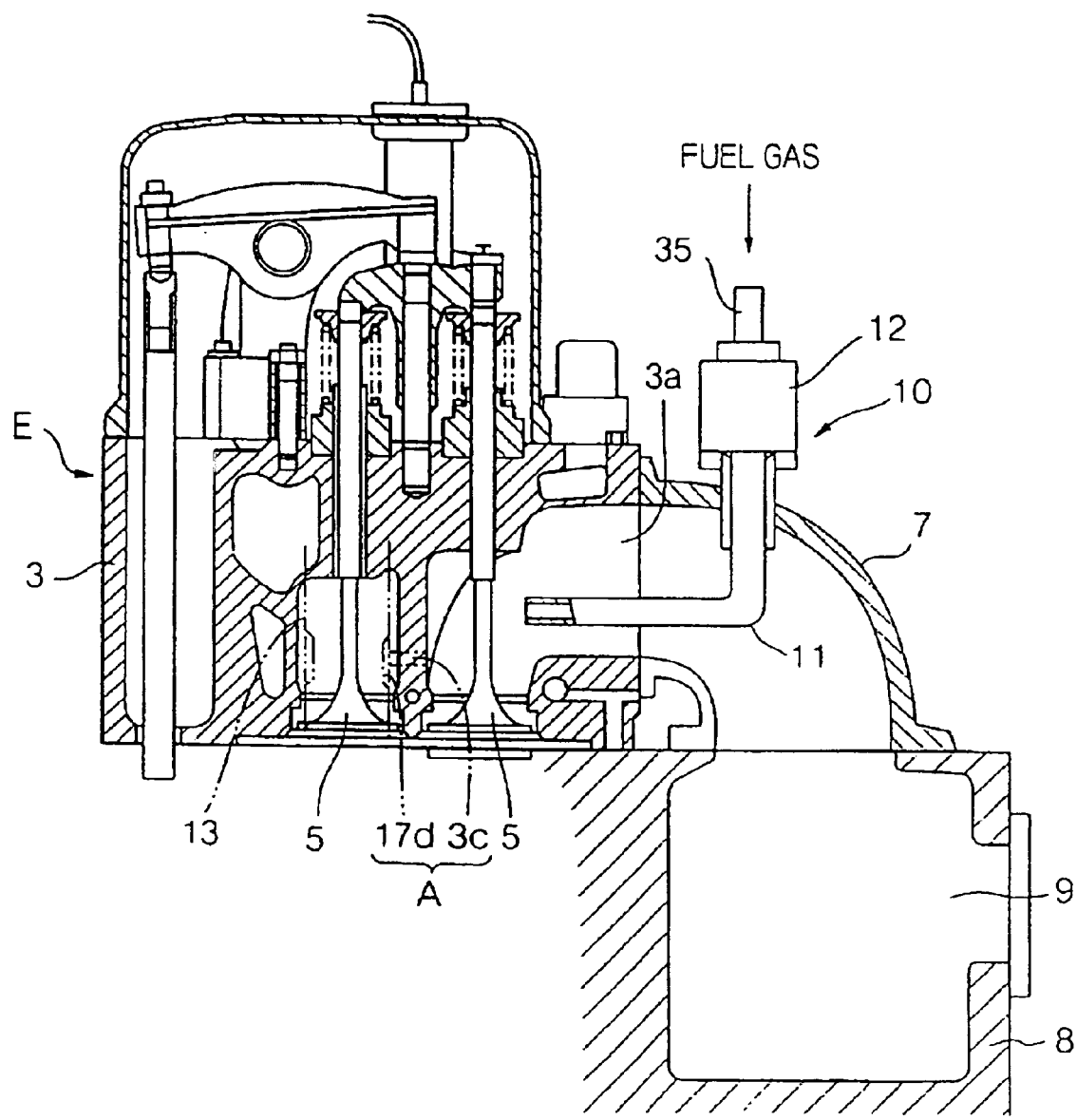
FIG. 3 is a vertical cross-sectional view showing another side of a vicinity of a cylinder head in the same embodiment.

FIGS. 1 and 3 are vertical cross-sectional views of one side and the other side of a cylinder head portion of a dual fuel engine E according to the present invention. FIG. 2 is a partial enlarged view of FIG. 1. In FIGS. 1 through 3, 1 is a cylinder liner of the dual fuel engine E. Inside the cylinder liner 1 a piston 2 is provided so as to move reciprocally up and down in accompaniment with a rotation of a crankshaft. 3 is a cylinder head having an intake port 3a and an exhaust port (not shown). 4 is a main combustion chamber enclosed by the cylinder liner 1, the piston 2, and the cylinder head 3. An intake valve 5 and an exhaust valve (not shown) that open and close communicating portions that connect the main combustion chamber 4 are provided respectively in the intake port 3a and the exhaust port (not shown) of the cylinder head 3.

The intake port 3a is connected via an intake manifold 7 to an intake trunk 9 provided a cylinder column 8. A fuel gas feeding apparatus 10 that feeds fuel gas (i.e., a vapor fuel) to the main combustion chamber 4 is mounted on the intake manifold 7. The fuel gas feeding apparatus 10 is provided with a fuel gas feeding tube 11 that is fixed to the intake manifold 7 and is bent into an L shape, and which distal end portion opens into the intake port 3a, and with an electromagnetic valve 12 that opens and closes the fuel gas feeding tube 11.

A compression ratio control valve 13 is mounted in a central portion of the cylinder head 3. Precombustion chamber units 15 provided with electromagnetic fuel injection valves (liquid fuel injection valves) 14 are mounted respectively on both side portions of the cylinder head 3. The compression ratio control valve 13 is provided with a cylindrical valve casing 17, a valve rod 18, an electromagnetic coil 19, and a compression spring 22. The valve casing 17 is fixed to the inside of a holder 16, which is removably attached to the cylinder head 3, and is provided with a valve seat 17b in an aperture 17a that connects with the main combustion chamber 4. The valve rod 18 is inserted into the valve casing 17 so as to be able to move up and down freely, and has a valve portion 18a that abuts against the valve seat 17b. The electromagnetic coil 19 is fixed to a top end of the holder 16, and moves the valve rod 18 downwards by suctioning a suction shaft 18b provided at a top end of the valve rod 18 so as to move the valve rod 18 downwards and thereby open the aperture 17a. The compression spring 22 is fitted inside a large diameter hole 17c in the valve casing 17 between a spring bearing 20 and a spring seat 21 fixed to the suction shaft 18b. Movement of the spring bearing 20 downwards is restricted by a step portion at the bottom of the large diameter hole 17c.

An annular groove 17d is formed at a lower periphery of the valve casing 17. The annular groove 17d communicates with an interior 17f of the valve casing 17 via either one or a plurality of holes 17e that open in a diametrical direction in the valve casing 17. The annular groove 17d also communicates with the intake port 3a via a passage 3c formed in the cylinder head 3. It is also possible for the passage 3c to be provided in place of a hole in the cylinder head 3. The valve portion 18a of the valve rod 18 is joined via a small diameter shaft portion 18d to a large diameter guide shaft portion 18c that is fitted so as to able to slide freely in the axial direction inside the valve casing 17. Central portions of the large diameter guide shaft portion 18c are formed with a slightly narrower diameter in order to reduce friction resistance when the valve rod 18 slides along the valve casing 17 so that a space 17g is formed between the valve casing 17 and the guide shaft portion 18c. Ring shaped air accumulation grooves 17h are formed in both end portions of the guide shaft portion 18c in order to improve the sealing. Note that when the valve rod 18 is operated by the electromagnetic coil 19, as in the present embodiment, the air accumulation grooves 17h may be omitted, however, when the valve rod 18 is operated by working fluid such as compressed air instead of by the electromagnetic coil 19, it is preferable that the air accumulation grooves 17h be provided.

In the compression ratio control valve 13, when the valve portion 18a has opened the aperture 17a, the main combustion chamber 4 is in communication with the intake port 3a via the interior 17f of the valve casing 17, the hole 17e, the annular groove 17d, and the passage 3c.

The aperture 17a, the interior 17f of the valve casing 17, the hole 17e, the annular groove 17d, and the passage 3c form an air passage A that connects the main combustion chamber 4 with the exterior thereof. The valve casing 17, the valve rod 18 and the like form an opening and closing mechanism B of the compression ratio control valve 13 that opens and closes the air passage A.

The precombustion chamber units 15 are provided with unit holders 23 that are removably fixed to the cylinder head 3, precombustion chamber members 24 that are fixed to bottom ends of the unit holders 23 and have cylindrical precombustion chambers 24a formed inside them, precombustion chamber lids 25 that are fixed to bottom ends of the precombustion chamber members 24 and which lower end portions are provided with one or a plurality of injection nozzles 25a that communicate with the main combustion chamber 4, and valve holders 26 having oil galleries 26a that introduce liquid fuel and to which bottom end are fixed electromagnetic fuel injection valves 14. Nozzles of the electromagnetic fuel injection valves 14 are opened and closed by excitation of an electromagnetic coil 14a (see FIG. 4). Liquid fuel from the oil galleries 26a is injected into the precombustion chambers 24a.

Figure 4:
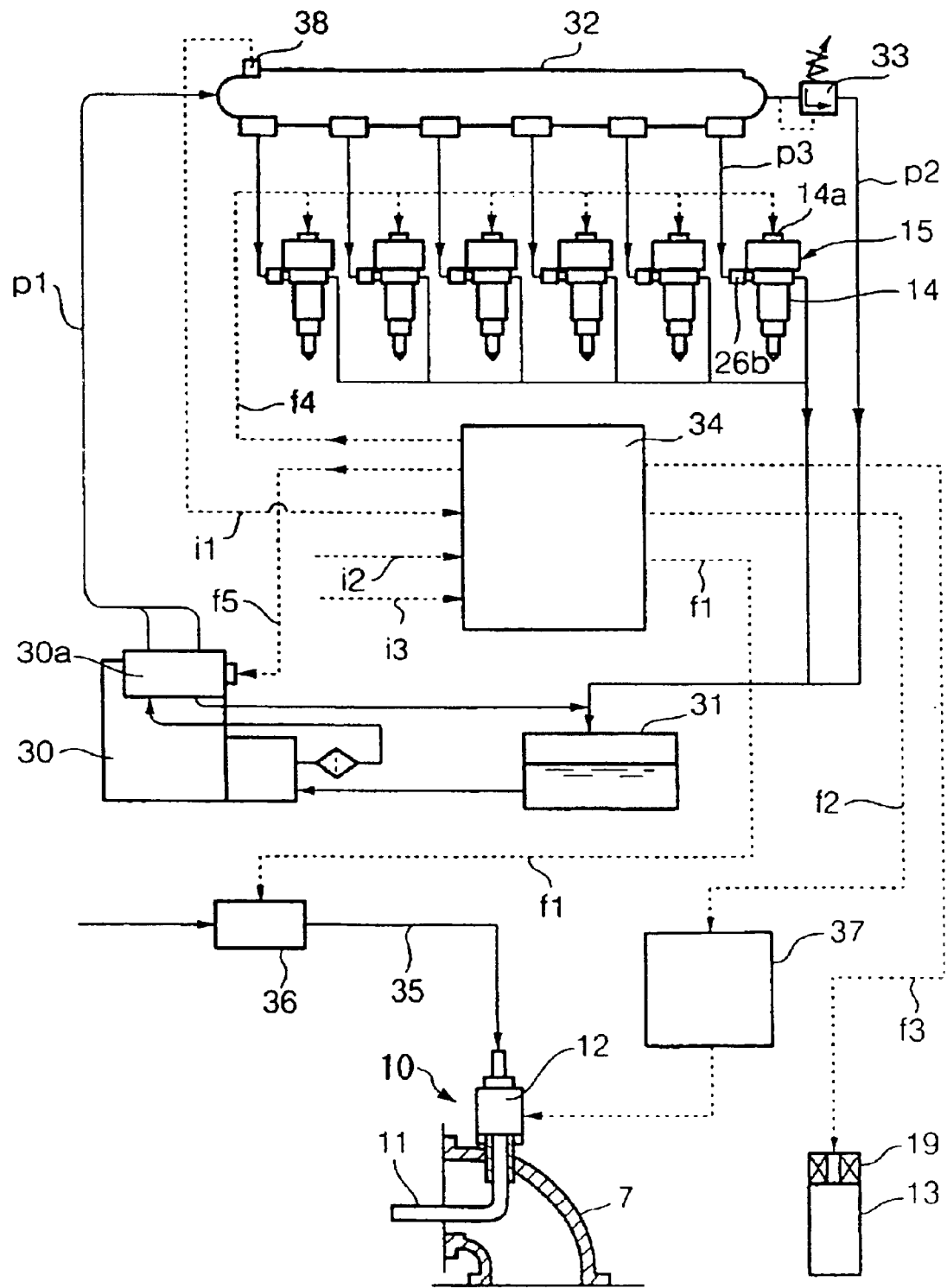
FIG. 4 is a system diagram of a control apparatus of the same embodiment.

Next, a control apparatus of the dual fuel engine E will be described based on FIG. 4. In FIG. 4, 30 is a high pressure pump that is driven by a crankshaft of the dual fuel engine E. Liquid fuel inside a fuel tank 31 is suctioned or pressurized by the high pressure pump 30 so as to be fed from an electromagnetic proportional pressure control valve 30a to an accumulator pipe 32 via piping p1. The accumulator pipe 32 is connected to the fuel tank 31 via piping p2 that has a pressure relief valve 33. The hydraulic pressure of liquid fuel accumulated in the accumulator pipe 32 is arbitrarily set within the range of 10 to 200 MPa by the electromagnetic proportional pressure control valve 30a. The oil galleries 26a of the electromagnetic fuel injection valves 14 of the precombustion chamber units 15 provided in each cylinder of the dual fuel engine E are connected to the accumulator pipe 32 by high pressure pipes p3 via couplings 26b.

34 is a control apparatus and is electrically connected so as to output command signals f1, f2, f3, f4, and f5 respectively to a fuel gas cutoff valve 36 provided in a gas pipe 35 that is connected to the fuel gas feeding pipe 11 of the fuel gas feeding apparatus 10, an electromagnetic valve driver 37 that operates the electromagnetic valve 12, an electromagnetic coil 19 of the compression ratio control valve 13, an electromagnetic coil 14a of the electromagnetic fuel injection valves 14 provided in the precombustion chamber units 15, and the electromagnetic proportional pressure control valve 30a of the high pressure pump 30. Furthermore, the control apparatus 34 receives inputs of signals i1 from a pressure sensor 38 that is mounted on the accumulator pipe 32 and detects pressure inside the accumulator pipe 32, and signals i2 from sensors that detect the engine rotation speed and output and the like. The control apparatus 34 also receives inputs of changeover signals i3 indicating gas operation/diesel operation of the engine, which is selected by an operation mode changeover switch (not shown).

Logic that executes operation control of the dual fuel engine E is also built into the control apparatus 34. Namely, when gas operation mode is selected by the operation mode changeover switch, as is shown by the line a in FIG. 5, the operation of the dual fuel engine E is controlled such that the effective compression ratio (i.e., the compression ratio) Pc of the main combustion chamber 4 is maintained at a constant high value in the low load region L1 after engine startup. In the medium load region L2 the effective compression ratio Pc is made to gradually change from the high value to a small value in accordance with the load. In the high load region L3 the effective compression ratio Pc is maintained at a constant low value. When diesel operation mode is selected, the operation of the dual fuel engine E is controlled such that, as is shown by the line b in FIG. 5, the effective compression ratio Pc is maintained at a constant high value in the same way as in the low load region L1 after startup when in gas operation mode.

Figure 6:
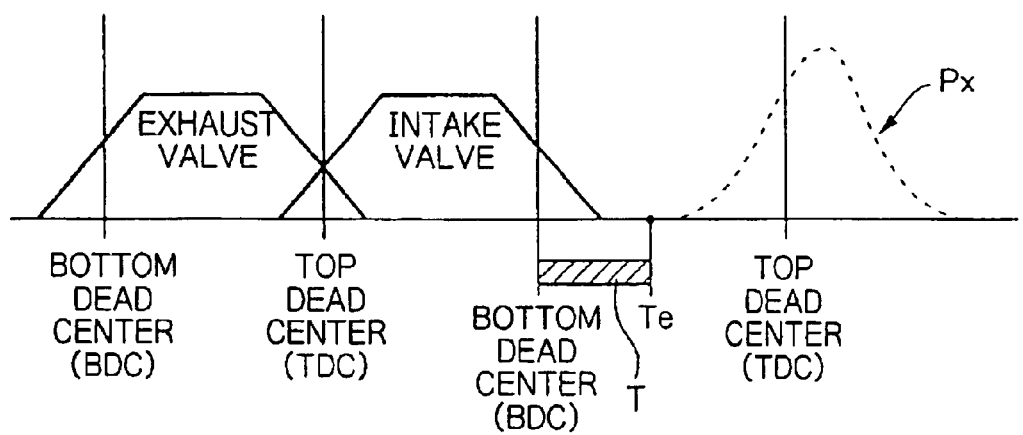
FIG. 6 is a graph showing a valve open time of a compression ratio control valve.

Here, as is shown in FIG. 6, the effective compression ratio Pc is decided by the valve open period T of the compression ratio control valve 13. This valve open period T is from when the valve opening and closing mechanism B of the compression ratio control valve 13 opens at the start time of the compression stroke of the piston 2 (i.e., bottom dead center-BDC) and a portion of a vapor (which is a mixture of air and fuel gas in gas operation mode and is just air in diesel operation mode) is discharged from the main combustion chamber 4 into the intake port 3a after passing through the valve casing 17 of the compression ratio control valve 13 and the air passage A in the passage 3c until the time Te when the opening and closing mechanism B of the compression ratio control valve 13 closes. Note that Px in FIG. 6 is the pressure of the vapor inside the main combustion chamber 4 formed by the cylinder liner 1, the piston 2, the cylinder head 3 and the like.

Figure 7:
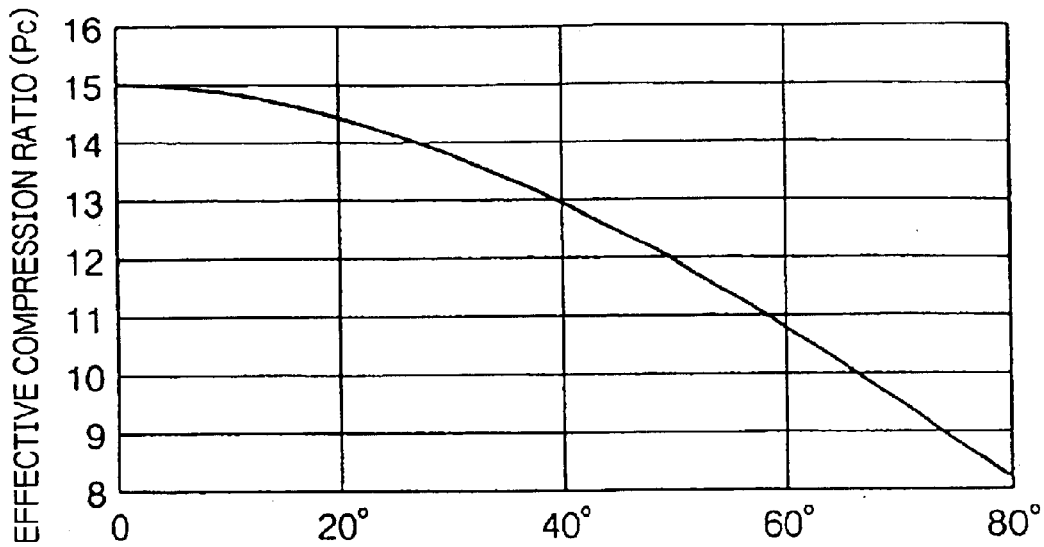
FIG. 7 is a graph showing a relationship between a valve shut time of a compression ratio control valve and an effective compression ratio.

Namely, if the rotation angle of the crankshaft at the start time of the compression stroke of the piston 2 (bottom dead center-BDC) is 0° and at this time the opening and closing mechanism B of the compression ratio control valve 13 is opened, the relationship between the effective compression ratio Pc and the valve closing timing of the compression ratio control valve 13, which is based on the rotation angle of the crankshaft, is as is shown in FIG. 7.

Figure 5:
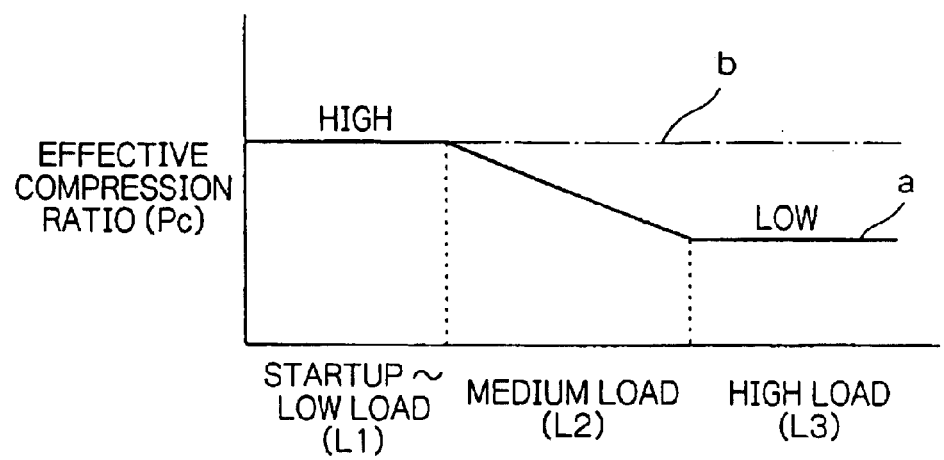
FIG. 5 is a graph showing a relationship between operating load and effective compression ratio.

Accordingly, the valve closing timings of the compression ratio control valve 13 in the regions L2, L2, and L3 of the respective loads are set based on the relationships shown in FIGS. 5 and 7, and the excitation times of the electromagnetic coil 19 of the compression ratio control valve 13 are controlled by these. Specifically, for example, using the relationship shown in FIG. 5, the control apparatus 34 decides the effective compression ratio (Pc) from the current load state of the dual fuel engine E, and decides the valve closing timing of the compression ratio control valve 13 from the decided effective compression ratio (Pc), using the relationship shown in FIG. 7. The control apparatus 34 then controls the excitation times of the electromagnetic coil 19 of the compression ratio control valve 13 based on the decided valve closing timing.

In gas operation mode, the electromagnetic fuel injection valves 14 of the precombustion units 15 are set such that a fixed pilot quantity (approximately 1% of the total heat quantity) of liquid fuel required to serve as an ignition source for the mixture of air and fuel gas (i.e., a vapor fuel) in the main combustion chamber 4 is injected, while in diesel operation mode, the electromagnetic fuel injection valves 14 of the precombustion units 15 are set such that a quantity of liquid fuel that corresponds to the operating load of the engine is injected by speed governing control.

Next, the operation of the dual fuel engine E having the structure described above will be described.

When diesel operation mode is selected by the operation mode changeover switch and a changeover signal i3 is input therefrom into the control apparatus 34, the control apparatus 34 sends command signals f1, f2, and f3 to the fuel gas cutoff valve 36, the electromagnetic valve driver 37, and the electromagnetic coil 19 of the compression ratio control valve respectively. The fuel gas cutoff valve 36 and the electromagnetic valve 12 of the fuel gas feeding apparatus 10 are then closed so that the feeding of fuel gas to the intake port 3a is stopped. Together with this, the valve portion 18a of the compression ratio control valve 13 closes the aperture 17a so that communication between the air passage A and the main combustion chamber 4 is shut off by the compression ratio control valve 13.

Furthermore, the apparatus is set such that a command signal f5 is sent from the control apparatus 34 to the electromagnetic proportional control valve 30a of the high pressure pump 30 and control is performed such that liquid fuel inside the accumulator pipe 32 is accumulated at a predetermined pressure based on a detection value from the pressure sensor 38. In addition, a command signal f4 is sent to the electromagnetic fuel injection valves 14 of each precombustion chamber unit 15 so that the electromagnetic fuel injection valves 14 undergo speed governing control. Namely, using signals i2 that are based on detection values from sensors that detect the rotation speed and output of the engine, the control apparatus 34 controls the nozzle open times, using the command signals f4 to the electromagnetic coils 14a of the electromagnetic fuel injection valves 14, such that liquid fuel gas is injected from the electromagnetic fuel injection valves 14 into the precombustion chamber 24a in a quantity that corresponds to the operating load in order to keep the rotation speed constant. The liquid fuel injected from the electromagnetic fuel injection valves 14 is ignited using air introduced into the precombustion chamber 24a from the main combustion chamber 4. It is then injected into the main combustion chamber 4 from the injection nozzles 25a, and is combusted using air that is compressed to a high compression ratio suitable for diesel operation.

In this diesel operation mode, because the engine is operated using a precombustion method in which liquid fuel serving as the main fuel is ignited in the precombustion chamber 24a and then combusted, the discharge density of NOx is suppressed.

If gas operation mode is selected by the operation mode changeover switch and a changeover signal i3 indicating a changeover from diesel operation to gas operation is input into the control apparatus 34, the control apparatus 34 sends command signals f1, f2, and f4 respectively to the fuel gas cutoff valve 36, the electromagnetic valve driver 37, and the electromagnetic fuel injection valves 14 of each precombustion chamber unit 15. The fuel gas cutoff valve 36 is then opened and the injection quantities of liquid fuel injected by the electromagnetic fuel injection valves 14 are gradually decreased and are then fixed at the set value for the pilot quantity (approximately 1% of the total heat quantity). In addition, the electromagnetic valve driver 37 is placed in an open state as a result of speed governing control being performed on the electromagnetic valve 12 of the fuel gas feeding apparatus 10, and the main fuel is changed over to fuel gas. This changeover may be performed at an optional engine load.

At the same time as this changeover operation, a command signal f3 that controls excitation time is sent from the control apparatus 34 to the electromagnetic coil 19 of the compression ratio control valve 13 such that the valve closing timing Te of the opening and closing mechanism B of the compression ratio control valve 13 in the regions L1, L2, and L3 of each of the loads is in a set state that is based on the relationships shown in FIGS. 5 and 7.

In the gas operation after the changeover from diesel operation, because the electromagnetic valve driver 37 is operated by a command signal f2 from the control apparatus 34 and adjusts the open time of the electromagnetic valve 12 using speed governing control, namely, by controlling the fuel gas quantity so that the number of engine revolutions is constant, a quantity of fuel gas that corresponds to the operating load is fed from the gas pipe 35 to the interior of the intake port 3a via the fuel gas feeding pipe 111 of the fuel gas feeding apparatus 10. This fuel gas is mixed with air fed from the intake trunk 9 into the intake port 3a via the intake manifold 7 and is introduced into the main combustion chamber 4. After it is then compressed in the compression stroke, a portion thereof is ignited inside the precombustion chamber 24a of the precombustion chamber unit 15 by the pilot quantity of liquid fuel injected from the electromagnetic fuel injection valve 14, and flame is discharged from the injection aperture 25a. The air gas mixture inside the main combustion chamber 4 is then combusted using this flame as an ignition source.

In this case, at the startup of a gas operation or when operating at low load, the time between the opening of the compression ratio control valve 13 at the start of the compression stroke and the closing thereof (i.e., the valve open time T) is set as a short time, and the quantity of air gas mixture escaping from the main combustion chamber 4 to the intake port 3a via the air passage A that is formed by the aperture portion 17a, the hole 17e, the annular groove 17d, and the passage 3c of the compression ratio control valve 13 is decreased, with the compression ratio of the air gas mixture being set at a high level. As a result, the compression ignition of the pilot quantity of liquid fuel is performed excellently without an ignition combustion device such as an ignition plug or glow plug being used, and the engine is started.

Accordingly, an engine can be started quickly and reliably by gas operation without the engine being warmed up, and operation at low load can be achieved smoothly with the thermal efficiency and combustion stability in an improved state. Moreover, because no ignition combustion device is used, the structure of the engine is correspondingly simplified and the number of parts is decreased thereby increasing reliability. The additional advantage of reduced manufacturing costs is also obtained.

When operating at a high load, the valve open period T of the compression ratio control valve 13 is set as a long period so that air gas mixture escaping from the main combustion chamber 4 to the intake port 3a increases and the compression ratio of the air gas mixture is set at a low level. Furthermore, when operating at medium load, which is between low load and high load, control is performed such that, as the load increases, the compression ratio is gradually reduced from the compression ratio at low load to the compression ratio at high load.

Therefore, during each of the above described loads, combusting of the fuel gas inside the main combustion chamber 4 is carried out in an excellent manner without engine knocking occurring, enabling a high level of thermal efficiency to be obtained and a smooth gas operation to be performed.

Furthermore, when in gas operation, the injection quantity is reduced to a very small amount (approximately 1% of the total heat quantity) by performing the combustion by compression ignition of the pilot quantity of liquid fuel. As a result, it is possible to ensure the discharge density of NOx and soot generated by combusting liquid fuel at ignition is kept to an absolute minimum, and exhaust gas regulation values for gas operation can be met satisfactorily.

Note that the changeover from gas operation to diesel operation can be performed easily by using the command signal f4 to cancel the setting for the injection quantity of liquid fuel in the electromagnetic fuel injection valve 14 from the pilot quantity that has been fixed at a constant value, at the same time as the fuel gas cutoff valve 36 is closed in response to a command signal f1 from the control apparatus 34, and by closing the compression ratio control valve 13 by demagnetizing the electromagnetic coil 19 of the compression ratio control valve 13. Namely, when the electromagnetic coil 19 is demagnetized the valve rod 18 is lifted up by the compression spring 22 so that the valve portion 18a closes the aperture 17a of the valve casing 17. Subsequently, the communication between the main combustion chamber 4 and the air passage A is shut off by the opening and closing mechanism B of the compression ratio control valve 13. As a result, there is no escape of the air in the main combustion chamber 4 to the intake port 3a, and the compression ratio of the air is set at a high value suitable for diesel operation. Accordingly, the injection of liquid fuel by the electromagnetic fuel injection valve 14 can be implemented immediately by speed governing control corresponding to the load.

Note that, in the dual fuel engine E of the above described embodiment, the opening and closing timings of the compression ratio control valve 13 are set such that the valve is opened at the start time of the gas compression stroke by the piston 2, and the valve is closed when the crankshaft reaches a predetermined crankshaft rotation angle with the engine crankshaft rotation angle at the start time of the compression stroke taken as a reference. For example, the settings may be made such that the valve is closed based on the engine crankshaft rotation angle with the start time of the compression stroke of the piston 2 being taken as 0°. Therefore, it is more preferable that the setting of the effective compression ratio inside the main combustion chamber 4 is accurate. However, the setting of the opening and closing timings of the compression ratio control valve 13 is not limited to this, and the timings may be set at other timings provided that the opening and closing timings of the compression ratio control valve 13 are in the initial period of the start of the compression stroke of the piston 2.

Figure 8:
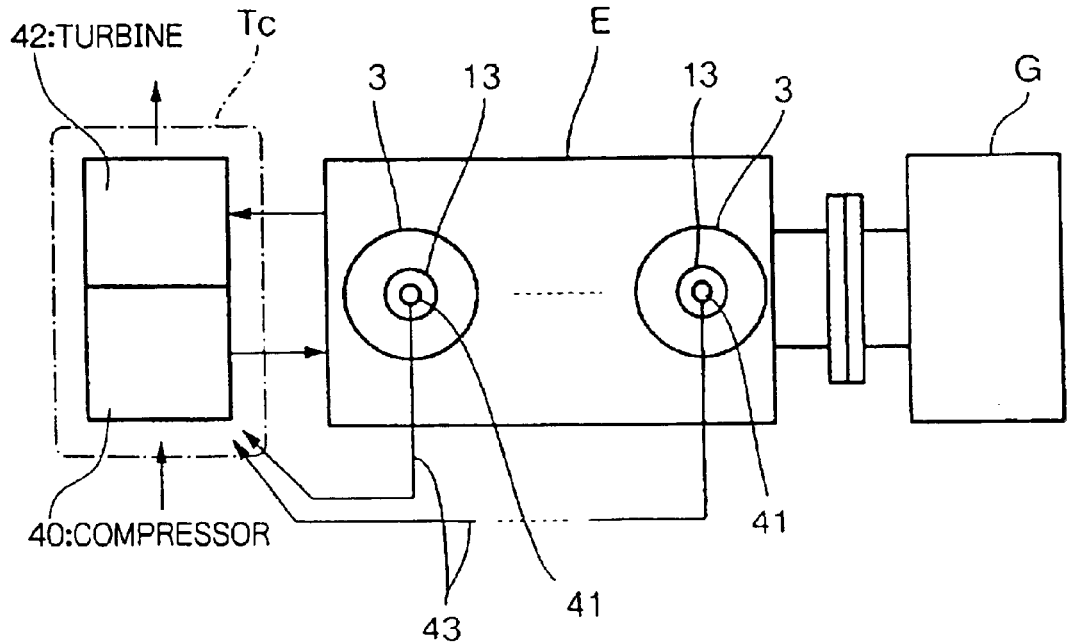
FIG. 8 is a system diagram showing a jet assist apparatus of the dual fuel engine according to the present invention.

In the dual fuel engine E of the above described embodiment, a structure is employed in which air gas mixture inside the main combustion chamber 4 is allowed by the compression ratio control valve 13 to escape to the intake port 3a via the air passage 3c in the cylinder head 3 in order to adjust the compression ratio of the air gas mixture of fuel gas and air inside the main combustion chamber 4. However, instead of this, as is shown in FIGS. 8 and 9, it is also possible to employ a structure in which air gas mixture that has escaped from the main combustion chamber 4 to the outside thereof is blown to an impeller 40a of a compressor 40 of an exhaust turbocharger Tc provided in the dual fuel engine E.

In this case, air holes 41 that open onto a top portion of the cylinder 3 are provided in the compression ratio control valve 13 mounted on the cylinder head 3 via the holder 16 and the like, and running in the axial direction of the compression ratio control valve 13. Bottom ends of the air holes 41 are connected to the hole 17e, while top ends thereof are connected via pipes 43 to an insert intake manifold 44 formed around the impeller 40a of the compressor 40 in the exhaust turbocharger Tc. A plurality of jet assist insert holes 45 running in the circumferential direction in the insert intake manifold 44 open onto external portions of the impeller 40a of the compressor 40. Compressed air gas mixture from the main combustion chamber 4 is blown into the compressor impeller 40 from the jet assist insert holes 45.

Figure 9:
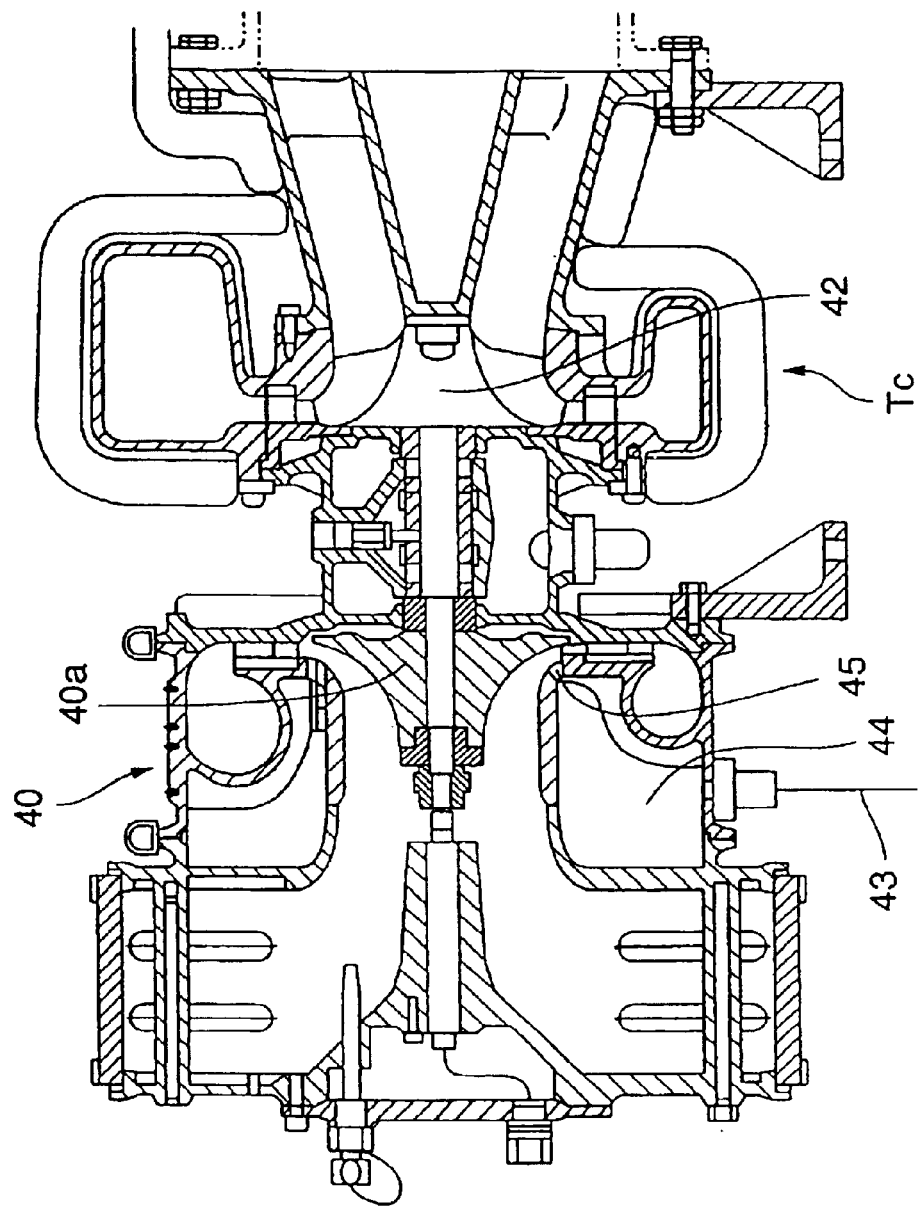
FIG. 9 is a vertical cross-sectional view of an exhaust turbocharger on which a jet assist apparatus is mounted.

Note that, in FIG. 9, 42 is an exhaust turbine that is driven by exhaust gas from an exhaust port (not shown) of the dual fuel engine E, while G is an output load apparatus such as a generator that is driven by the engine E.

In this manner, if fuel air mixture is blown into the impeller 40a of the compressor 40 in the exhaust turbocharger Tc, the transient response performance of the exhaust turbocharger Tc is improved and the quantity of air that is sent to the main combustion chamber 4 is increased. As a result, the effect is obtained that the exhaust temperature and quantity of black smoke that is output at low loads are reduced.

What is claimed is:

1. A dual fuel engine that provides drive output by combusting, in a main combustion chamber partitioned by a cylinder, by a piston that moves reciprocally inside this cylinder, and by a cylinder head having an intake port provided with an intake valve and an exhaust port provided with an exhaust valve, one of either a gas fuel or a liquid fuel in a gas compressed by the piston in accordance with an operation mode, wherein:

the dual fuel engine is provided with a precombustion chamber unit, which is located in the cylinder head of the dual fuel engine, having a precombustion chamber that has a liquid fuel injection valve and that combusts liquid fuel injected from the liquid fuel injection valve by introducing the compressed gas, the dual fuel engine is also provided with a compression ratio control valve that is located in an air passage that connects the main combustion chamber with the exterior of the main combustion chamber and that varies the compression ratio of the gas in an initial stage of compression of the gas by the piston by opening and closing the air passage so as to allow a portion of the compressed gas to escape to the air passage, and with a fuel gas feeding apparatus that feeds gas fuel to the main combustion chamber;

the fuel gas feeding apparatus is provided with a gas feeding pipe that is connected to the intake port, an electromagnetic valve that adjusts a feeding quantity of gas fuel from a gas fuel source to the gas feeding pipe, and an electromagnetic valve driver that drives the electromagnetic valve to open and close by speed governing control;

injection of a pilot quantity of liquid fuel by the liquid fuel injection valve and injection of liquid fuel by speed governing control are possible;

the compression ratio control valve operated by an electromagnetic coil with adjustment of a valve opening time from when the valve is opened so as to communicate the main combustion chamber with the air passage until the valve is closed so as to shut off this communication being possible in accordance with an operating state of the engine, and a control apparatus that operates each is connected to the electromagnetic valve driver, the liquid fuel injecting valve, and the electromagnetic coil, and this control apparatus operates by selection of the operation mode and when in gas operation operates the electromagnetic valve driver by speed governing control such that the electromagnetic valve is opened and closed, and operates the liquid fuel injection valve to cause it to inject a pilot quantity of liquid fuel, and also operates the electromagnetic coil such that the valve opening time of the compression ratio control valve is adjusted in accordance with the operating state of the engine, while when in diesel operation operates the electromagnetic valve driver such that the electromagnetic valve is closed, and operates the liquid fuel injection valve such that injection of liquid fuel by speed governing control is performed, and also operates the electromagnetic coil such that the compression ratio control valve is closed.

2. The dual fuel engine according to claim 1, wherein, in gas operation mode, the compression ratio control valve adjusts opening and closing timings of the air passage in accordance with an operation state such as engine startup, low load operation, or high load operation, and adjusts the compression ratio by raising it for startup and low load operation and lowering it for high load operation.

3. The dual fuel engine according to claim 2, wherein opening and closing timings of the compression ratio control valve are set such that the valve is opened at a start time of a compression stroke of the gas by the piston, and the valve is closed when a predetermined crankshaft rotation angle is reached with the engine crankshaft rotation angle at the start time of the compression stroke taken as a reference.

4. The dual fuel engine according to claim 1, wherein the air passage is connected to the intake port.

5. The dual fuel engine according to claim 4, wherein the air passage is connected to an insert intake manifold of an exhaust turbocharger that is driven by exhaust gas from the exhaust port and feeds compressed air to the intake port.

6. The dual fuel engine according to claim 1, wherein the air passage is connected to an insert intake manifold of an exhaust turbocharger that is driven by exhaust gas from the exhaust port and feeds compressed air to the intake port.

7. A dual fuel engine that provides drive output by combusting, in a main combustion chamber partitioned by a cylinder, by a piston that moves reciprocally inside this cylinder, and by a cylinder head having an intake port provided with an intake valve and an exhaust port provided with an exhaust valve, one of either a gas fuel or a liquid fuel in a gas compressed by the piston in accordance with an operation mode, wherein:

the dual fuel engine is provided with a precombustion chamber unit, which is located in the cylinder head of the dual fuel engine, having a precombustion chamber that has a liquid fuel injection valve and that combusts liquid fuel injected from the liquid fuel injection valve by introducing the compressed gas, the dual fuel engine is also provided with a compression ratio control valve that is located in an air passage that connects the main combustion chamber with the exterior of the main combustion chamber and that varies the compression ratio of the gas in an initial stage of compression of the gas by the piston by opening and closing the air passage so as to allow a portion of the compressed gas to escape to the air passage, and with a fuel gas feeding apparatus that feeds gas fuel to the main combustion chamber; and the air passage is connected to the intake port.

8. The dual fuel engine according to claim 7, wherein the air passage is connected to an insert intake manifold of an exhaust turbocharger that is driven by exhaust gas from the exhaust port and feeds compressed air to the intake port.

9. The dual fuel engine according to claim 7, wherein, in gas operation mode, the compression ratio control valve adjusts opening and closing timings of the air passage in accordance with an operation state such as engine startup, low load operation, or high load operation, and adjusts the compression ratio by raising it for startup and low load operation and lowering it for high load operation.

10. The dual fuel engine according to claim 9, wherein opening and closing timings of the compression ratio control valve are set such that the valve is opened at a start time of a compression stroke of the gas by the piston, and the valve is closed when a predetermined crankshaft rotation angle is reached with the engine crankshaft rotation angle at the start time of the compression stroke taken as a reference.

11. A dual fuel engine that provides drive output by combusting, in a main combustion chamber partitioned by a cylinder, by a piston that moves reciprocally inside this cylinder, and by a cylinder head having an intake port provided with an intake valve and an exhaust port provided with an exhaust valve, one of either a gas fuel or a liquid fuel in a gas compressed by the piston in accordance with an operation mode, wherein:

the dual fuel engine is provided with a precombustion chamber unit, which is located in the cylinder head of the dual fuel engine, having a precombustion chamber that has a liquid fuel injection valve and that combusts liquid fuel injected from the liquid fuel injection valve by introducing the compressed gas, the dual fuel engine is also provided with a compression ratio control valve that is located in an air passage that connects the main combustion chamber with the exterior of the main combustion chamber and that varies the compression ratio of the gas in an initial stage of compression of the gas by the piston by opening and closing the air passage so as to allow a portion of the compressed gas to escape to the air passage, and with a fuel gas feeding apparatus that feeds gas fuel to the main combustion chamber; and the air passage is connected to an insert intake manifold of an exhaust turbocharger that is driven by exhaust gas from the exhaust port and feeds compressed air to the intake port.

12. The dual fuel engine according to claim 11, wherein, in gas operation mode, the compression ratio control valve adjusts opening and closing timings of the air passage in accordance with an operation state such as engine startup, low load operation, or high load operation, and adjusts the compression ratio by raising it for startup and low load operation and lowering it for high load operation.

13. The dual fuel engine according to claim 12, wherein opening and closing timings of the compression ratio control valve are set such that the valve is opened at a start time of a compression stroke of the gas by the piston, and the valve is closed when a predetermined crankshaft rotation angle is reached with the engine crankshaft rotation angle at the start time of the compression stroke taken as a reference.

* * * * *